United States Patent [19]
Calamera

[11] Patent Number: 5,966,441
[45] Date of Patent: Oct. 12, 1999

[54] METHOD AND APPARATUS FOR CREATING A SECURE AUTONOMOUS NETWORK ENTITY OF A NETWORK COMPONENT SYSTEM

[75] Inventor: Pablo M. Calamera, San Jose, Calif.

[73] Assignee: Apple Computer, Inc., Cupertino, Calif.

[21] Appl. No.: 08/751,317

[22] Filed: Nov. 18, 1996

[51] Int. Cl.[6] .................................................. H04L 9/00
[52] U.S. Cl. ................................... 380/4; 380/9; 380/21; 380/23; 380/25; 380/49; 380/50; 395/186; 395/187.01
[58] Field of Search .............................. 380/25, 4, 9, 21, 380/23, 28, 49, 50, 59, 30; 395/186, 187.01, 188.01

[56] References Cited

U.S. PATENT DOCUMENTS

| | | | |
|---|---|---|---|
| 4,980,913 | 12/1990 | Skret | 380/23 |
| 5,251,165 | 10/1993 | James, III | 364/717 |
| 5,455,865 | 10/1995 | Perlman | 380/49 |
| 5,495,533 | 2/1996 | Linehan et al. | 380/21 |
| 5,584,035 | 12/1996 | Duggan et al. | 395/800 |
| 5,666,411 | 9/1997 | McCarty | 380/4 |
| 5,708,709 | 1/1998 | Rose | 380/4 |
| 5,719,942 | 2/1998 | Aldred et al. | 380/49 |
| 5,724,506 | 3/1998 | Cleron et al. | 395/200.01 |
| 5,751,961 | 5/1998 | Smyk | 395/200.47 |
| 5,752,246 | 5/1998 | Rogers et al. | 707/10 |

OTHER PUBLICATIONS

MacWeek, Nov. 7, 1994, col. 8, No. 44, "Cyberdog to Fetch Internet Resources for Opendocapps", R. Hess.

Opinion MacWeek, Nov. 14, 1994, The Second Decade, "Cyberdog Could be a Breakthrough if It's Kept on a Leash", H. Norr.

Feiler, Jesse, "Cyberdog—The Complete Guide To Apple's Internet Productivity Technology", AP Professional, 1996, U.S.A., pp. iv–xviii, 284–285, 288–289, 296–298, 310–312, 345–347.

Apple Computer, Inc., "Cyberdog Programmer's Kit", Addison–Wesley Publishing Co., 1996, U.S.A., pp. 2–8, 32–33, 45–50, 53–59, 68–83, 241–242, 256–261, and 269–276.

*Primary Examiner*—Bernarr E. Gregory
*Attorney, Agent, or Firm*—Cesari and McKenna, LLP

[57] ABSTRACT

A technique is provided for creating an autonomous network entity that stores sensitive information in a cryptographically secure manner. The autonomous entity comprises a data structure that encapsulates cryptographically-transformed information along with the inputs of a secret key used to reverse the transformation. Cryptographic storage of the sensitive information and its reversable key within the encapsulated entity makes the entity autonomous and capable of transfer among computer platforms and their processes without compromising the security of the information.

20 Claims, 12 Drawing Sheets

METHOD AND APPARATUS FOR CREATING A SECURE AUTONOMOUS NETWORK ENTITY OF A NETWORK COMPONENT SYSTEM

CROSS-REFERENCE TO RELATED APPLICATIONS

This invention is related to the following copending U.S. patent applications:

U.S. patent application Ser. No. 08/435,377, titled EXTENSIBLE, REPLACEABLE NETWORK COMPONENT SYSTEM;

U.S. patent application Ser. No. 08/435,374, filed May 5, 1995, titled REPLACEABLE AND EXTENSIBLE NOTEBOOK COMPONENT OF A NETWORK COMPONENT SYSTEM, U.S. Pat. No. 5,784,619 issued Jul. 21, 1998;

U.S. patent application Ser. No. 08/435,862, titled REPLACEABLE AND EXTENSIBLE LOG COMPONENT OF A NETWORK COMPONENT SYSTEM;

U.S. patent application Ser. No. 08/435,213, filed May 5, 1995, titled REPLACEABLE AND EXTENSIBLE CONNECTION DIALOG COMPONENT OF A NETWORK COMPONENT SYSTEM, U.S. Pat. No. 5,724,506 issued Mar. 3, 1998;

U.S. patent application Ser. No. 08/435,671, filed May 5, 1995, titled EMBEDDING INTERNET BROWSER/BUTTONS WITHIN COMPONENTS OF A NETWORK COMPONENT SYSTEM, U.S. Pat. No. 5,781,189 issued Jul. 14, 1998; and U.S. patent application Ser. No. 08/435,880, titled ENCAPSULATED NETWORK ENTITY REFERENCE OF A NETWORK COMPONENT SYSTEM, each of which was filed May 5, 1995 and assigned to the assignee of the present invention, now abandoned.

FIELD OF THE INVENTION

This invention relates generally to computer networks and, more particularly, to an arrangement for creating and using secure network entities for use in computer networks such as the Internet.

BACKGROUND OF THE INVENTION

The Internet is a system of geographically distributed computer networks interconnected by computers executing networking protocols that allow users to interact and share information over the networks. Because of such wide-spread information sharing, the Internet has generally evolved into an "open" system for which developers can design software for performing specialized operations, or services, essentially without restriction. These services are typically implemented in accordance with a client/server architecture, wherein the clients, e.g., personal computers or workstations, are responsible for interacting with the users and the servers are computers configured to perform the services as directed by the clients. However, the network services may additionally be implemented in accordance with general network-centric computing operations.

Not surprisingly, each of the services available over the Internet is generally defined by its own networking protocol. A protocol is a set of rules governing the format and meaning of messages or "packets" exchanged over the networks. By implementing services in accordance with the protocols, computers cooperate to perform various operations, or similar operations in various ways, for users wishing to "interact" with the networks. The services typically range from browsing or searching for information having a particular data format using a particular protocol to actually acquiring information of a different format in accordance with a different protocol.

For example, the file transfer protocol (FTP) service facilitates the transfer and sharing of files across the Internet. The Telnet service allows users to log onto computers coupled to the networks, while the netnews protocol provides a bulletin-board service to its subscribers. Furthermore, the various data formats of the information available on the Internet include JPEG images, MPEG movies and $\mu$-law sound files.

Two fashionable services for accessing information over the Internet are Gopher and the World-Wide Web ("Web"). Gopher consists of a series of Internet servers that provide a "list-oriented" interface to information available on the networks; the information is displayed as menu items in a hierarchical manner. Included in the hierarchy of menus are documents, which can be displayed or saved, and searchable indexes, which allow users to type keywords and perform searches.

Some of the menu items displayed by Gopher are links to information available on other servers located on the networks. In this case, the user is presented with a list of available information documents that can be opened. The opened documents may display additional lists or they may contain various data-types, such as pictures or text; occasionally, the opened documents may "transport" the user to another computer on the Internet.

The other popular information service on the Internet is the Web. Instead of providing a user with a hierarchical list-oriented view of information, the Web provides the user with a "linked-hypertext" view. Metaphorically, the Web perceives the Internet as a vast book of pages, each of which may contain pictures, text, sound, movies or various other types of data in the form of documents. Web documents are written in HyperText Markup Language (HTML) and Web servers transfer HTML documents to each other through the HyperText Transfer Protocol (HTTP).

The Web service is essentially a means for naming sources of information on the Internet. Armed with such a general naming convention that spans the entire network system, developers are able to build information servers that potentially any user can access. Accordingly, Gopher servers, HTTP servers, FTP servers, and E-mail servers have been developed for the Web. Moreover, the naming convention enables users to identify resources (such as documents) on any of these servers connected to the Internet and allow access to those resources.

Netscape Navigator™ ("Netscape") is an example of a monolithic Web browser application that is configured to interact with many of the previously-described protocols, including HTTP, Gopher and FTP. When instructed to invoke an application that uses one of these protocols, Netscape "translates" the protocol to hypertext. This translation places the user farther away from the protocol designed to run the application and, in some cases, actually thwarts the user's Internet experience. For example, a discussion system requiring an interactive exchange between participants may be bogged down by hypertext translations.

The Gopher and Web services may further require additional applications to perform specific functions, such as playing sound or viewing movies, with respect to the data types contained in the documents. For example, Netscape employs helper applications for executing applications having data formats it does not "understand". Execution of these functions on a computer generally requires interruption of processing and context switching (i.e., saving of state) prior to invoking tile appropriate application. Thus, if a user operating within the Netscape application "opens" a MPEG movie, that browsing application must be saved (e.g., to disk) prior to opening an appropriate MPEG application, e.g., Sparkle, to view the image. Such an arrangement is inefficient and rather disruptive to processing operations of the computer.

Typically, a computer includes an operating system and application software which, collectively, control the operations of the computer. The applications are preferably task-specific and independent, e.g., a word processor application edits words, a drawing application edits drawings and a database application interacts with information stored on a database storage unit. Although a user can move data from one application to the other, such as by copying a drawing into a word processing file, the independent applications must be invoked to thereafter manipulate that data.

Generally, the application program presents information to a user through a window of a graphical user interface by drawing images, graphics or text within the window region. The user, in turn, communicates with the application by "pointing" at graphical objects in the window with a pointer that is controlled by a hand-operated pointing device, such as a mouse, or by pressing keys of a keyboard.

In contrast to this typical application-based computing environment, a software component architecture provides a modular document-based computing arrangement using tools such as viewing editors. The key to document-based computing is the compound document, i.e., a document composed of many different types of data sharing the same file. The types of data contained in a compound document may range from text, tables and graphics to video and sound. Several editors, each designed to handle a particular data type or format, can work on the contents of the document at the same time, unlike the application-based computing environment.

Since many editors may work together on the same document, the compound document is apportioned into individual modules of content for manipulation by the editors. The compound-nature of the document is realized by embedding these modules within each other to create a document having a mixture of data types. The software component architecture provides the foundation for assembling documents of differing contents and the present invention is directed to a system for extending this capability to network-oriented services.

To remotely access information stored on a resource of the network, the user typically invokes a service configured to operate in accordance with a protocol for accessing the resource. For example, the user may type an explicit destination address command that includes a uniform resource locator (URL). The URL is a rather long (approximately 50 character) address pointer that identifies both a network resource and a means for accessing that resource. U.S. patent application Ser. No. 08/435,880, filed May 5, 1995 now abandoned, identified above discloses a network-oriented component system for efficiently accessing information from a network resource located on a computer network by creating an encapsulated network entity that contains a reference to that resource. The reference to the network resource is preferably a "pointer", such as a URL, that identifies the network address of the resource.

It may be desirable to associate information securely with the encapsulated network entity in a persistent or temporal fashion. Such information may comprise a user's password, a network address or anything that may be considered sensitive if easily discovered by another party. The present invention is directed to securely associating information with the encapsulated network entity.

In addition, an object of the present invention is to simplify a user's experience on computer networks without sacrificing the flexibility afforded the user by employing existing protocols and data types available on those networks.

Another object of the invention is to provide users with a simple, but secure means for remotely accessing information stored on resources connected to computer networks.

SUMMARY OF THE INVENTION

The invention relates to a technique for creating an autonomous network entity that stores sensitive information in a cryptographically secure manner. The autonomous entity preferably comprises a data structure that encapsulates cryptographically-transformed information along with the inputs of a secret key used to reverse the transformation. Cryptographic storage of the sensitive information and its reversable key within the encapsulated entity makes the entity autonomous and capable of transfer among computer platforms and their processes without compromising the security of the information.

In accordance with the invention, the technique comprises a multi-stage key calculation process that generates the secret key for each instantiation of the network entity. The multi-stage calculation process, in turn, preferably comprises a random number generation stage followed by a crytographically-secure message digest stage for both encrypting the sensitive information and decrypting the encrypted information. Specifically, the secret key produced from the message digest stage is used to initially to encrypt the sensitive information prior to encapsulation within the network entity. To thereafter access the encrypted contents of the encapsulated entity, the key calculation process is repeated and the resulting key is used to decrypt the information.

When initially calculating the secret key, a random number R1 is generated by a conventional random number generator; the resulting R1 is used as a seed to generate a new random number R2. R2 is digested, along with any non-sensitive information associated with the network entity, e.g., a reference to the resource, using a cryptographically-secure message digest function. The resulting digest value is the secret key used to encrypt the sensitive information. The encrypted information and R1 are then associated with the encapsulated network entity by, e.g., storing them in various fields of the network entity. When subsequently calculating the secret key to decrypt the encrypted information, R1 is retrieved from the network entity and used as the seed for generating R2.

Advantageously, the inventive technique greatly enhances the ability of a user to associate sensitive information securely with the autonomous network entity in a persistent or temporal fashion. The network entity is preferably implemented as a network component of a network-oriented component system and stored as a visual object, e.g., an icon, for display on a graphical user interface of the system. Such visual display allows a user to easily (i) manipulate the entity component to display its contents on a computer screen, (ii) duplicate the entity by dragging the icon to other components of the system, or (iii) electronically forward the entity over computer networks, all while maintaining the integrity of the secure information. Moreover, by encapsulating the inputs of the secret key within the structural confines of the entity, the user may reverse the cryptographic transformation of the sensitive information at any time.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
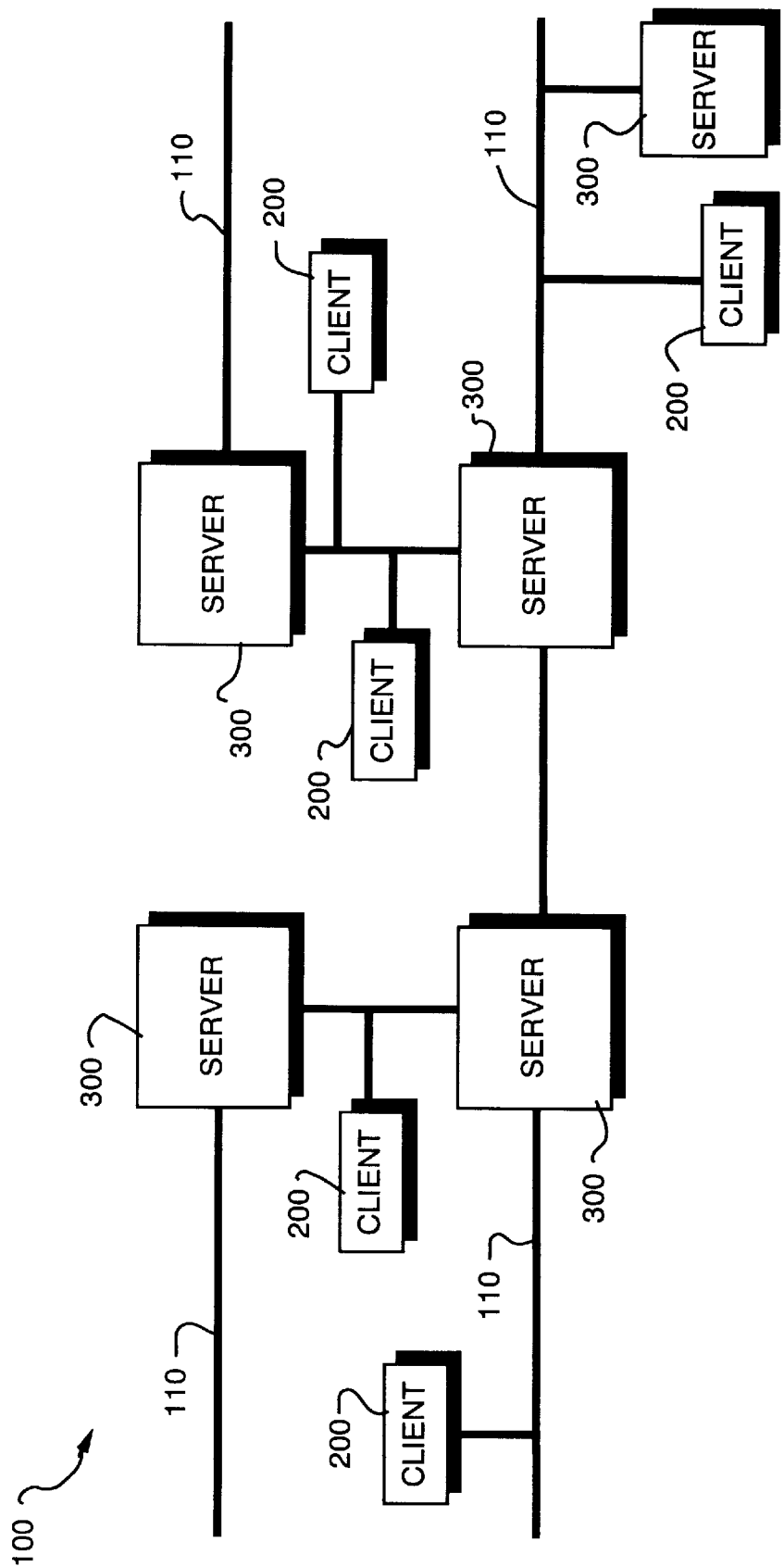
FIG. 1 is a block diagram of a network system including a collection of computer networks interconnected by client and server computers.

FIG. 1 is a block diagram of a network system 100 comprising a collection of computer networks 110 interconnected by client computers ("clients") 200, e.g., workstations or personal computers, and server computers ("servers") 300. The servers are typically computers having hardware and software elements that provide resources or services for use by the clients 200 to increase the efficiency of their operations. It will be understood to those skilled in the art that, in an alternate embodiment, the client and server may exist on the same computer. In still yet another alternate embodiment of the invention, the computing platform may comprise any network-centric platform that includes a computing device configured to interact with a server; however, for ease of description and depiction, the computing platform described herein comprise separate client and server computers.

Several types of computer networks 110, including local area networks LANs) and wide area networks (WANs), may be employed in the system 100. A LAN is a limited area network that typically consists of a transmission medium, such as coaxial cable or twisted pair, while a WAN may be a public or private telecommunications facility that interconnects computers widely dispersed. In the illustrative embodiment, the network system 100 is the Internet system of geographically distributed computer networks.

Computers coupled to the Internet typically communicate by exchanging discrete packets of information according to predefined networking protocols. Execution of these networking protocols allow users to interact and share information across the networks. As an illustration, in response to a user's request for a particular service, the client 200 sends an appropriate information packet to the server 300, which performs the service and returns a result back to the client 200.

Figure 2:
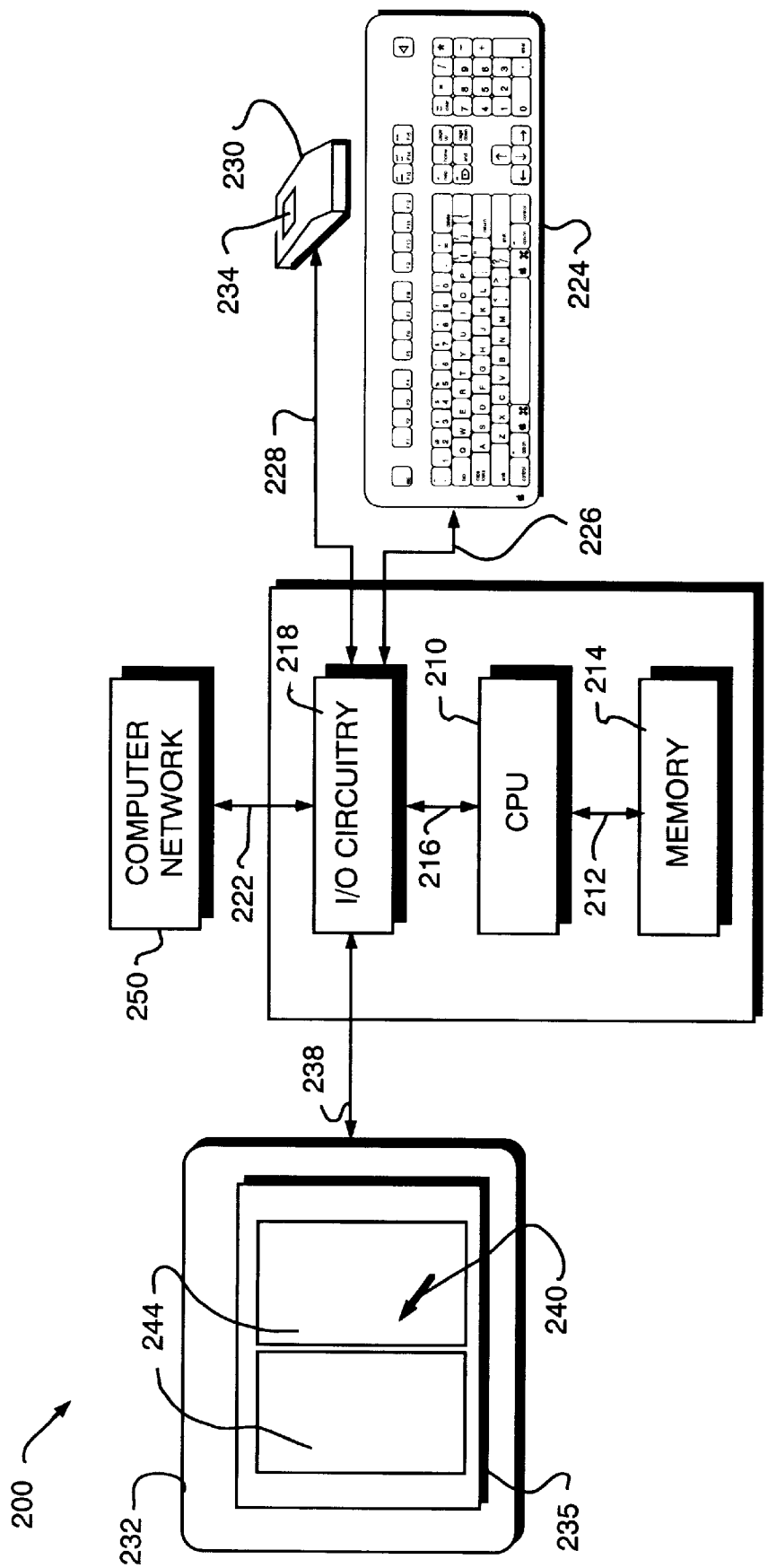
FIG. 2 is a block diagram of a client computer, such as a personal computer, on which the invention may advantageously operate.

FIG. 2 illustrates a typical hardware configuration of a client 200 comprising a central processing unit (CPU) 210 coupled between a memory 214 and input/output (I/O) circuitry 218 by bidirectional buses 212 and 216. The memory 214 typically comprises random access memory (RAM) for temporary storage of information and read only memory (ROM) for permanent storage of the computer's configuration and basic operating commands, such as portions of an operating system (not shown). As described further herein, the operating system controls the operations of the CPU 210 and client computer 200.

The I/O circuitry 218, in turn, connects the computer to computer networks, such as the Internet networks 250, via a bidirectional bus 222 and to cursor/pointer control devices, such as a keyboard 224 (via cable 226) and a mouse 230 (via cable 228). The mouse 230 typically contains at least one button 234 operated by a user of the computer. A conventional display monitor 232 having a display screen 235 is also connected to I/O circuitry 218 via cable 238. A pointer (cursor) 240 is displayed on windows 244 of the screen 235 and its position is controllable via the mouse 230 or the keyboard 224, as is well-known. The I/O circuitry 218 receives information, such as control and data signals, from the mouse 230 and keyboard 224, and provides that information to the CPU 210 for display on the screen 235 or, as described further herein, for transfer over the Internet 250.

Figure 3:
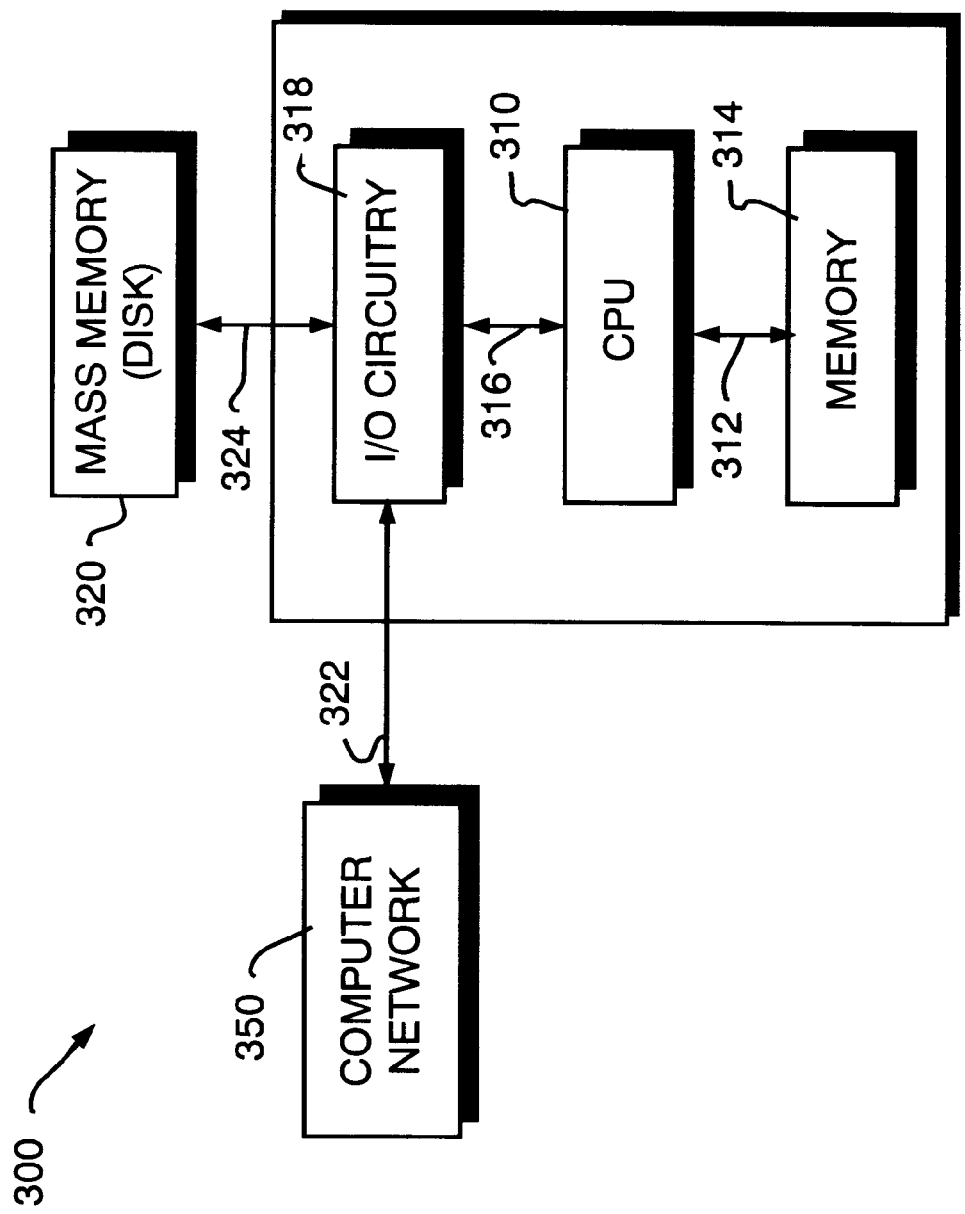
FIG. 3 is a block diagram of the server computer of FIG. 1.

FIG. 3 illustrates a typical hardware configuration of a server 300 of the network system 100. The server 300 has many of the same units as employed in the client 200, including a CPU 310, a memory 314 and I/O circuitry 318, each of which are interconnected by bidirectional buses 312 and 316. Also, the I/O circuitry connects the computer to computer networks 350 via a bidirectional bus 322. These units are configured to perform functions similar to those provided by their corresponding units in the computer 200. In addition, the server typically includes a mass storage unit 320, such as a disk drive, connected to the I/O circuitry 318 via bidirectional bus 324.

It is to be understood that the I/O circuits within the computers 200 and 300 contain the necessary hardware, e.g., buffers and adapters, needed to interface with the control devices, the display monitor, the mass storage unit and the network. Moreover, the operating system includes the necessary software drivers to control, e.g., network adapters within the I/O circuits when performing I/O operations, such as the transfer of data packets between the client 200 and server 300.

The computers are preferably personal computers of the Macintosh® series of computers sold by Apple Computer Inc., although the invention may also be practiced in the context of other types of computers, including the IBM® series of computers sold by International Business Machines Corp. These computers have resident thereon, and are controlled and coordinated by operating system software, such as the Apple® System 7®, IBM OS2®, or the Microsoft® Windows® operating systems.

Figure 4:
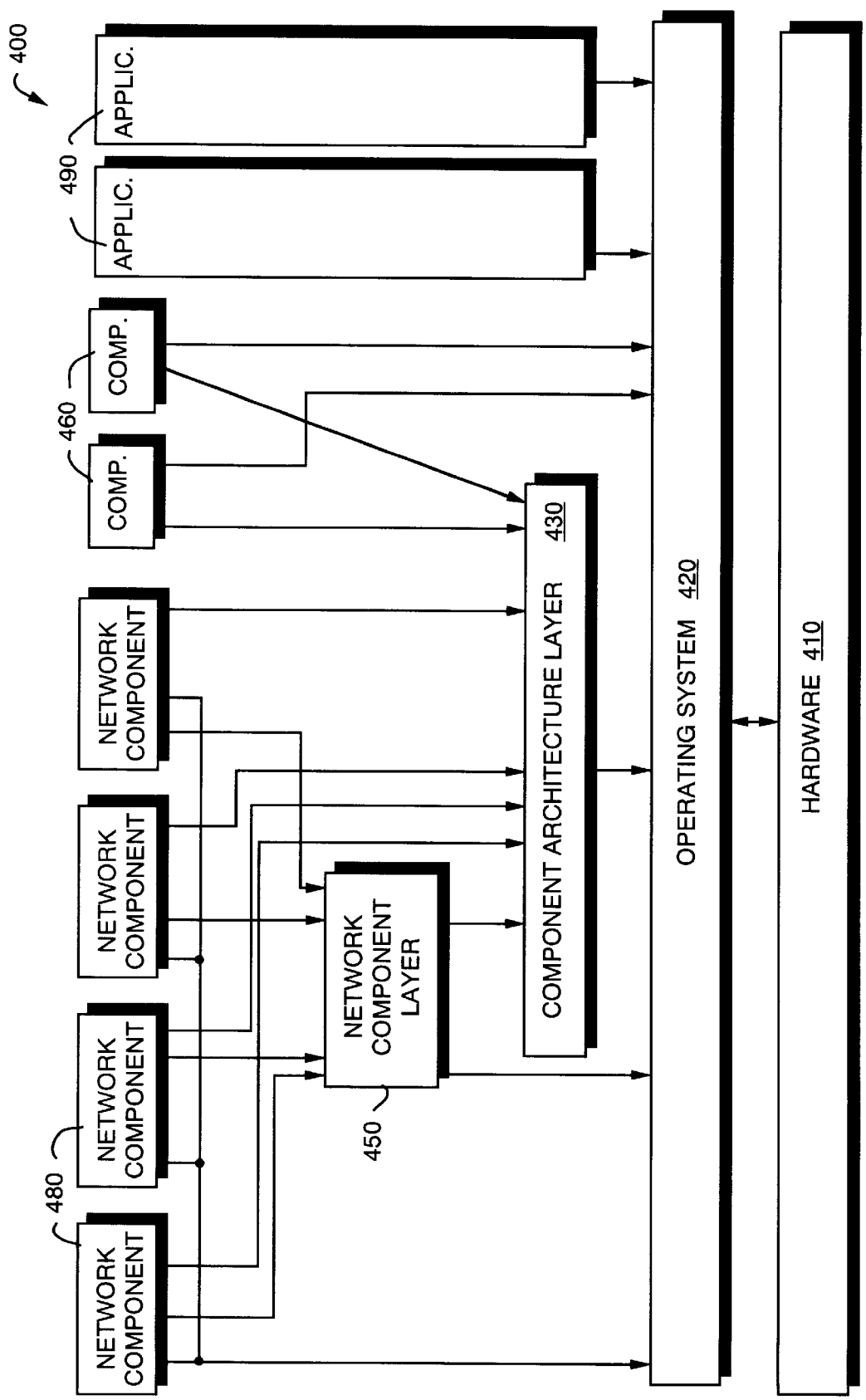
FIG. 4 is a highly schematized block diagram of a layered component computing arrangement in accordance with the invention.

As noted, the present invention is based on a modular document computing arrangement as provided by an underlying software component architecture; however, it should be understood that the invention may also be practiced in the context of a typical application-based (i.e., "executables") environment of prior computing systems. FIG. 4 is a highly schematized diagram of the hardware and software elements of a layered component computing arrangement 400 that includes the novel network-oriented component system of the invention. At the lowest level there is the computer hardware, shown as layer 410. Interfacing with the hardware is a conventional operating system layer 420 that includes a window manager, a graphic system, a file system and network-specific interfacing, such as a TCP/IP protocol stack and an Apple-talk protocol stack.

The software component architecture is preferably implemented as a component architecture layer 430. Although it is shown as overlaying the operating system 420, the component architecture layer 430 is actually independent of the operating system and, more precisely, resides side-by-side with the operating system. This relationship allows the component architecture to exist on multiple platforms that employ different operating systems.

In accordance with the present invention, a novel network-oriented component layer 450 contains the underlying technology for creating encapsulated entity components that contain references to network resources located on computer networks. As described further herein, communication among these components is achieved through novel application programming interfaces (APIs) to ensure integration with the underlying component architecture layer 430. These novel APIs are preferably delivered in the form of objects in a class hierarchy.

It should be noted that the network component layer 450 may operate with any existing system-wide component architecture, such as the Object Linking and Embedding (OLE) architecture developed by the Microsoft Corporation; however, in the illustrative embodiment, the component architecture is preferably OpenDoc, the vendor-neutral, open standard for compound documents developed by, among others, Apple Computer, Inc.

Using tools such as viewing editors, the component architecture layer 430 creates a compound document composed of data having different types and formats. Each differing data type and format is contained in a fundamental unit called a computing part or, more generally, a "component" 460 comprised of a viewing editor along with the data content. An example of the computing component 460 may include a MacDraw component. The editor, on the other hand, is analogous to an application program in a conventional computer. That is, the editor is a software component which provides the necessary functionality to display a component's contents and, where appropriate, present a user interface for modifying those contents. Additionally, the editor may include menus, controls and other user interface elements. The network component layer 450 extends the functionality of the underlying component architecture layer 430 by defining network-oriented components 480 that seamlessly integrate with these components 460 to provide basic tools for efficiently accessing information from network resources located on, e.g., servers coupled to the computer networks.

FIG. 4 also illustrates the relationship of applications 490 to the elements of the document computing arrangement 400. Although they reside in the same "user space" as the components 460 and network components 480, the applications 490 do not interact with these elements and, thus, interface directly to the operating system layer 420. Because they are designed as monolithic, autonomous modules, applications (such as previous Internet browsers) often do not even interact among themselves. In contrast, the components of the arrangement 400 are designed to work together and communicate via the common component architecture layer 430 or, in the case of the network components, via the novel network component layer 450.

Specifically, the invention features the provision of the network-oriented component system which, when invoked, causes actions to take place that enhance the ability of a user to interact with the computer to create encapsulated entities that contain references to network resources located on computer networks, such as the Internet. The encapsulated entities are manifested as visual objects to a user via a window environment, such as the graphical user interface provided by System 7 or Windows, that is preferably displayed on the screen 235 (FIG. 2) as a graphical display to facilitate interactions between the user and the computer, such as the client 200. This behavior of the system is brought about by the interaction of the network components with a series of system software routines associated with the operating system 420. These system routines, in turn, interact with the component architecture layer 430 to create the windows and graphical user interface elements, as described fiber herein.

The window environment is generally part of the operating system software 420 that includes a collection of utility programs for controlling the operation of the computer 200. The operating system, in turn, interacts with the components to provide higher level functionality, including a direct interface with the user. A component makes use of operating system functions by issuing a series of task commands to the operating system via the network component layer 450 or, as is typically the case, through the component architecture layer 430. The operating system 420 then performs the requested task. For example, the component may request that a software driver of the operating system initiate transfer of a data packet over the networks 250 or that the operating system display certain information on a window for presentation to the user.

Figure 5:
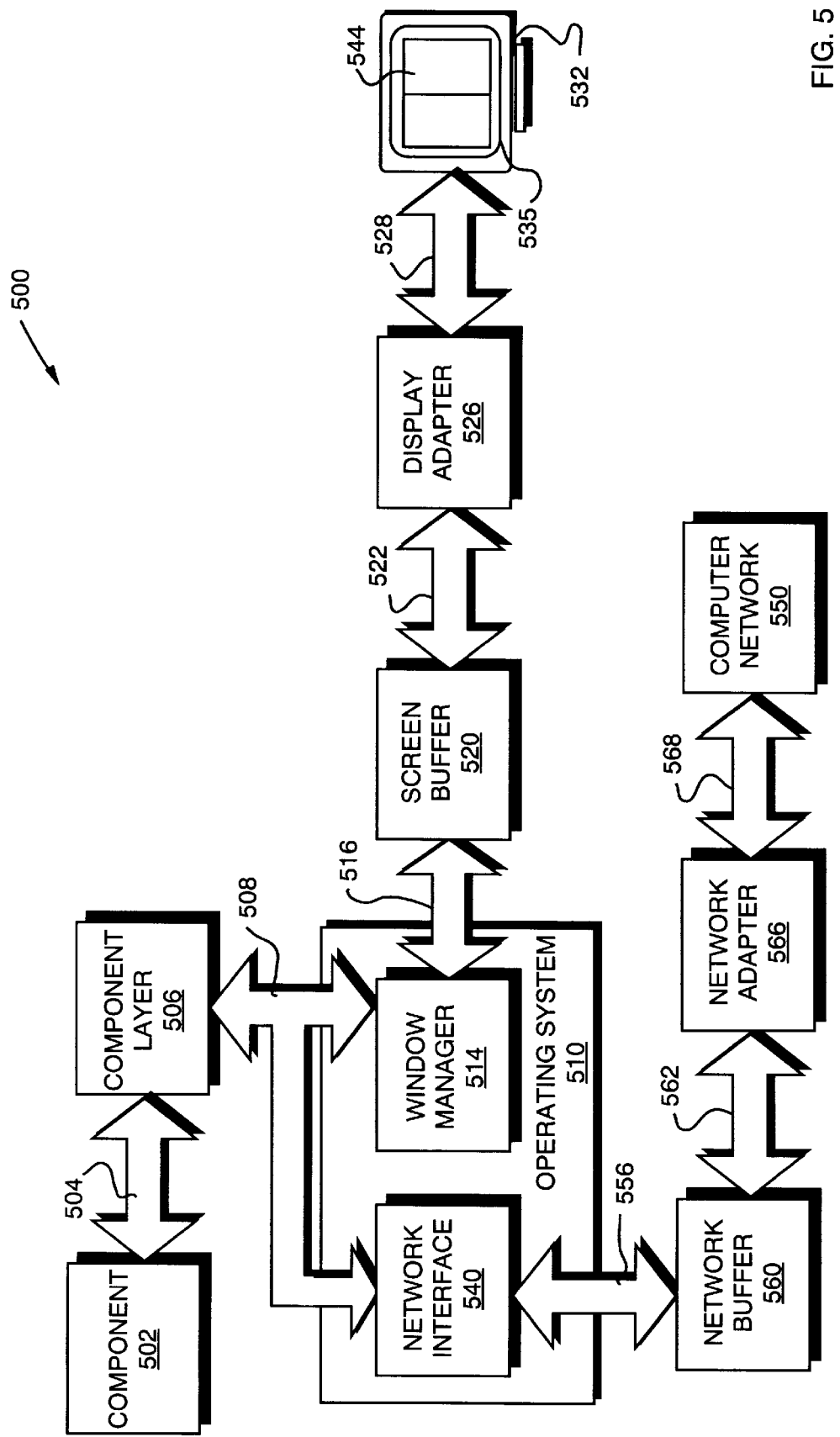
FIG. 5 is a schematic illustration of the interaction of a component, a software component layer and an operating system of the computer of FIG. 2.

FIG. 5 is a schematic illustration of the interaction of a component 502, software component layer 506 and an operating system 510 of a computer 500, which is similar to, and has equivalent elements of, the client computer 200 of FIG. 2. As noted, the network component layer 450 (FIG. 4) is integrated with the component architecture layer 430 to provide a cooperating architecture that allows any encapsulated entity and network component to "transport" the user to the network location of a remote resource; accordingly, for purposes of the present discussion, the layers 430 and 450 may be treated as a single software component layer 506.

The component 502, component-layer 506 and operating system 510 interact to control and coordinate the operations of the computer 500 and their interaction is illustrated schematically by arrows 504 and 508. In order to display information on a screen display 535, the component 502 and component layer 506 cooperate to generate and send display commands to a window manager 514 of the operating system 510. The window manager 514 stores information directly (via arrow 516) into a screen buffer 520.

The window manager 514 is a system software routine that is generally responsible for managing windows 544 that the user views during operation of the network component system. That is, it is generally the task of the window manager to keep track of the location and size of the window and window areas which must be drawn and redrawn in connection with the network component system of the present invention.

Under control of various hardware and software in the system, the contents of the screen buffer 520 are read out of the buffer and provided, as indicated schematically by arrow 522, to a display adapter 526. The display adapter contains hardware and software (sometimes in the form of firmware) which converts the information in the screen buffer 520 to a form which can be used to drive a display screen 535 of a monitor 532. The monitor 532 is connected to display adapter 526 by cable 528.

Similarly, in order to transfer information as a packet over the computer networks, the component 502 and component layer 506 cooperate to generate and send network commands, such as remote procedure calls, to a network-specific interface 540 of the operating system 510. The network interface comprises system software routines, such as "stub" procedure software and protocol stacks, that are generally responsible for formating the information into a predetermined packet format according to the specific network protocol used, e.g., TCP/IP or Apple-talk protocol.

Specifically, the network interface 540 stores the packet directly (via arrow 556) into a network buffer 560. Under control of the hardware and software in the system, the contents of the network buffer 560 are provided, as indicated schematically by arrow 562, to a network adapter 566. The network adapter incorporates the software and hardware, i.e., electrical and mechanical interchange circuits and characteristics, needed to interface with the particular computer networks 550. The adapter 566 is connected to the computer networks 550 by cable 568.

In a preferred embodiment, the encapsulated network entity described herein is implemented in accordance with an object-oriented programming (OOP) language, such as C++, using System Object Model (SOM) technology and OOP techniques. As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. An example of an encapsulated network entity suitable for use with the present invention is provided in copending and commonly assigned U.S. patent application Ser. No. 08/435,880, titled Encapsulated Network Entity Reference of a Network Component System, filed May 5, 1995, which application is incorporated by reference as though fully set forth herein, now abandoned.

Figure 6:
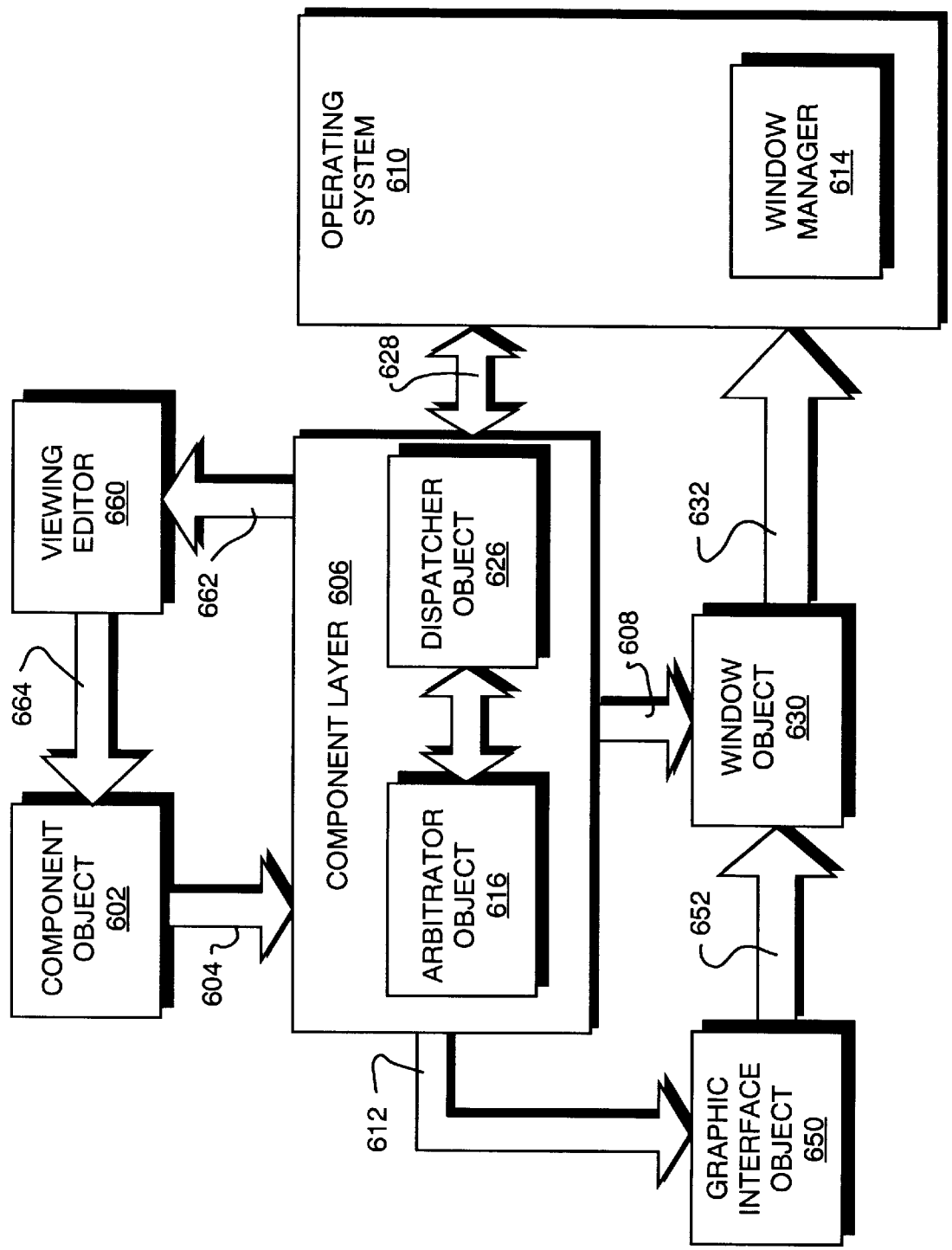
FIG. 6 is a schematic illustration of the interaction between a component, a component layer and a window manager.

The component 502 and windows 544 are "objects" created by the component layer 506 and the window manager 514, respectively, the latter of which may be an object-oriented program. Interaction between a component, component layer and a window manager is illustrated in greater detail in FIG. 6. In general, the component layer 606 interfaces with the window manager 614 by creating and manipulating objects. The window manager itself may be an object which is created when the operating system is started.

Specifically, the component layer creates window objects 630 that cause the window manager to create associated windows on the display screen. This is shown schematically by an arrow 608. In addition, the component layer 606 creates individual graphic interface objects 650 that are stored in each window object 630, as shown schematically by arrows 612 and 652. Since many graphic interface objects may be created in order to display many interface elements on the display screen, the window object 630 communicates with the window manager by means of a sequence of drawing commands issued from the window object to the window manager 614, as illustrated by arrow 632.

As noted, the component layer 606 functions to embed components within one another to form a compound document having mixed data types and formats. Many different viewing editors may work together to display, or modify, the data contents of the document. In order to direct keystrokes and mouse events initiated by a user to the proper components and editors, the component layer 606 includes an arbitrator 616 and a dispatcher 626.

The dispatcher is an object that communicates with the operating system 610 to identify the correct viewing editor 660, while the arbitrator is an object that informs the dispatcher as to which editor "owns" the stream of keystrokes or mouse events. Specifically, the dispatcher 626 receives these "human-interface" events from the operating system 610 (as shown schematically by arrow 628) and delivers them to the correct viewing editor 660 via arrow 662. The viewing editor 660 then modifies or displays, either visually or acoustically, the contents of the data types.

The window object 630 and the graphic interface object 650 are elements of a graphical user interface of a network component system that greatly enhances the ability of a user to efficiently access information from a network resource on computer networks by creating an encapsulated entity that contains a reference to that resource. The encapsulated entity is preferably implemented as a network component of the system and stored as a visual object, e.g., an icon, for display on a graphical user interface. Such visual display allows a user to easily manipulate the entity component to display the contents of the resource on a computer screen or to electronically forward the entity over the networks.

Figure 7:
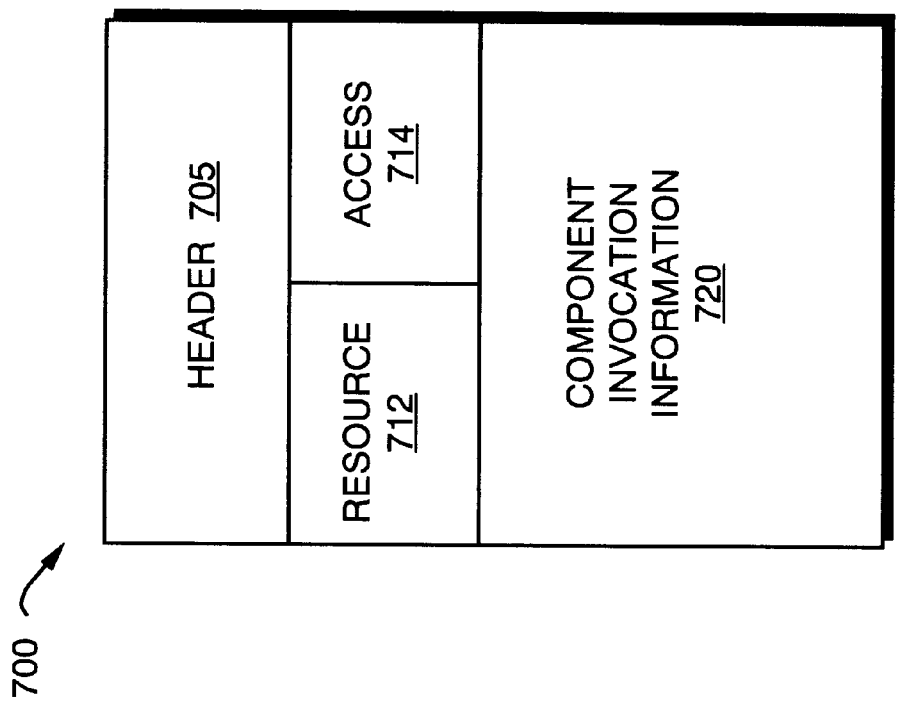
FIG. 7 is a highly schematized diagram of an encapsulated network entity object.

Furthermore, the reference to the network resource is a pointer that identifies the network address of the resource, e.g., a Gopher browser, a Web page or an E-mail message. FIG. 7 is a highly schematized diagram of an encapsulated network entity object 700 that may be implemented as a data structure having a plurality of fields, including a header field 705 and a pointer field 710. The header field 705 is preferably a 32-bit field containing a version string that identifies the current version of the structure 700. That is, any changes to the structure of the entity, e.g., the addition or subtraction of fields, results in a new version string being associated with the entity.

The pointer field 710 preferably contains a reference pointer, e.g., a uniform resource locator (URL), having a first portion 712 that identifies the particular network resource and a second portion 714 that specifies the means for accessing that resource. More specifically, the URL is a string of approximately 50 characters that describes the protocol used to address the target resource, the server on which the resource resides, the path to the resource and the resource filename. It is to be understood, however, that other representations of a "pointer" are included within the principles of the invention, e.g., a Post Office Protocol (POP) account and message identification (ID), as well as non-protocol representations such as a printer device.

In addition to storing the pointer, the encapsulated entity also contains information 720 for invoking appropriate network components needed to access the, resource. Communication among these network components is achieved through application programming interfaces (APIs). These APIs are preferably delivered in the form of objects in a class hierarchy that is extensible so that developers can create new components. In particular, a set of interconnected abstract classes are provided for defining network-oriented objects used to build the customized network components. These abstract classes include CyberItem, CyberStream and CyberExtension and the objects they define are used to build the novel network components. A description of these abstract classes is provided in copending and commonly assigned U.S. patent application Ser. No. 08/435,377, titled Extensible, Replaceable Network Component System, filed May 5, 1995, now U.S. Pat. No. 5,784,619, which application is incorporated by reference as though fully set forth herein.

Specifically, the CyberItem class defines the encapsulated entity object which interacts with objects defined by the other abstract classes of the network system to "transport" the user to the network location, i.e., remotely access information from the referenced resource and display that information to the user at the computer. Since these objects are integral elements of the cooperating component architecture, any type of encapsulated network entity may be developed with consistent behaviors, i.e., these entities may be manifested as visual objects that can be distributed and manipulated iconically.

Figure 8:
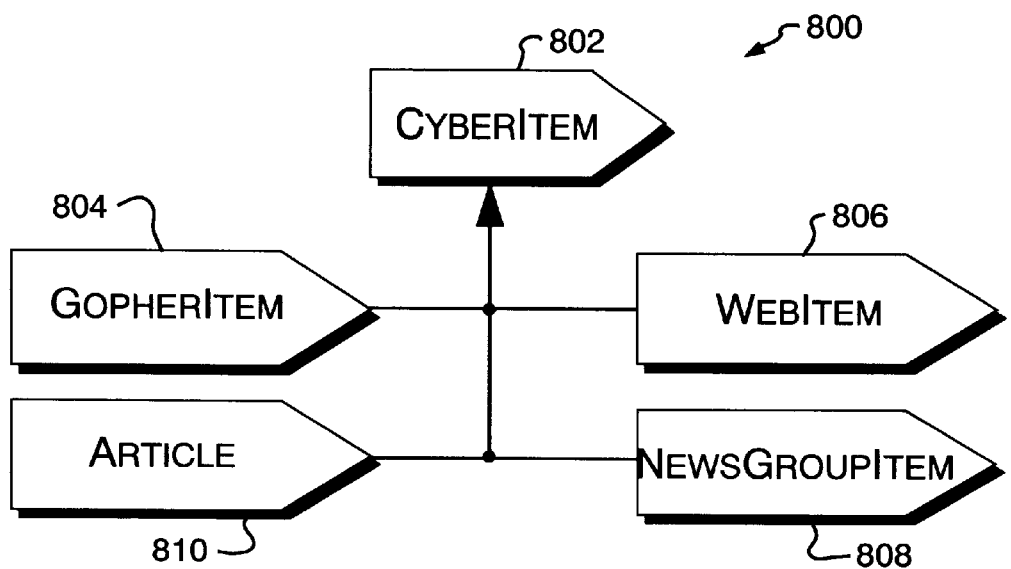
FIG. 8 is a simplified class heirarchy diagram illustrating a base class CyberItem, and its associated subclasses, used to construct network component objects in accordance with the invention.

FIG. 8 illustrates a simplified class hierarchy diagram 800 of the base class CyberItem 802 used to construct the encapsulated network entity component object 602. In accordance with the illustrative embodiment, subclasses of the CyberItem base class are used to construct various network component objects configured to provide such services for the novel network-oriented component system. For example, the subclass GopherItem 804 is derived from the CyberItem class 802 and encapsulates a network entity component object representing a "thing in Gopher space", such as a Gopher directory.

Since each of the classes used to construct these network component objects are subclasses of the CyberItem base class, each class inherits the functional operators and methods that are available from that base class. Accordingly, methods associated with the CyberItem base class for, e.g., instructing an object to open itself, are assumed by the subclasses to allow the network components to display CyberItem objects in a consistent manner.

Figure 9:
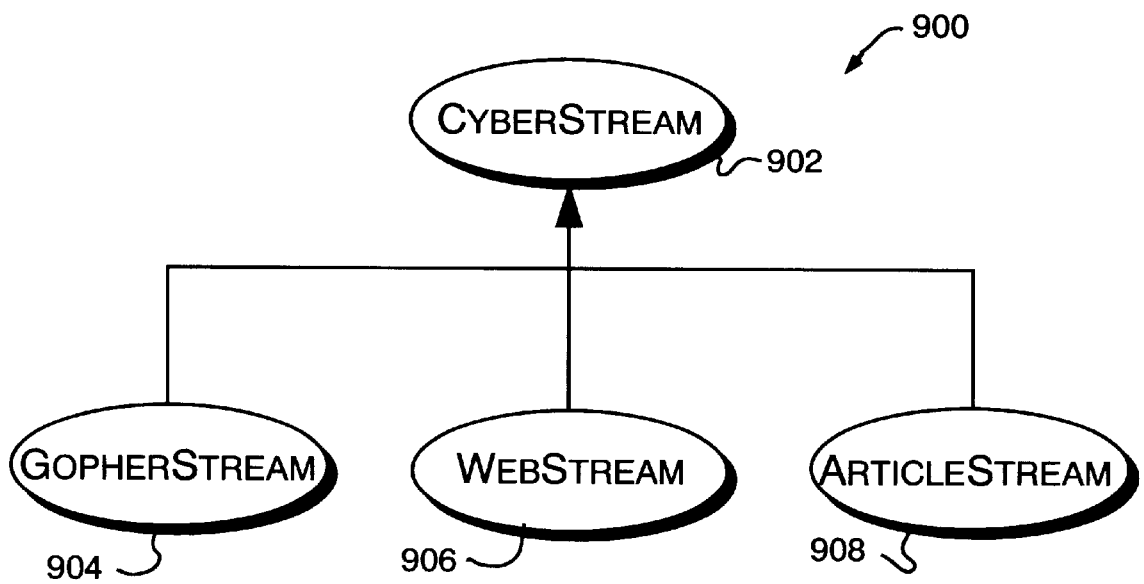
FIG. 9 is a simplified class heirarchy diagram illustrating a base class CyberStream, and its associated subclasses.

In some instances, a CyberItem object may need to spawn a CyberStream object in order to obtain the actual data for the object it represents. FIG. 9 illustrates a simplified class hierarchy diagram 900 of the base class CyberStream 902 which is an abstraction that serves as an API between a component configured to display a particular data format and the method for obtaining the actual data. Specifically, a CyberStream object contains the software commands necessary to create a "data stream" for transfering information from one object to another. According to the invention, a GopherStream subclass 904 is derived from the CyberStream base class 902 and encapsulates a network object that implements the Gopher protocol.

Figure 10:
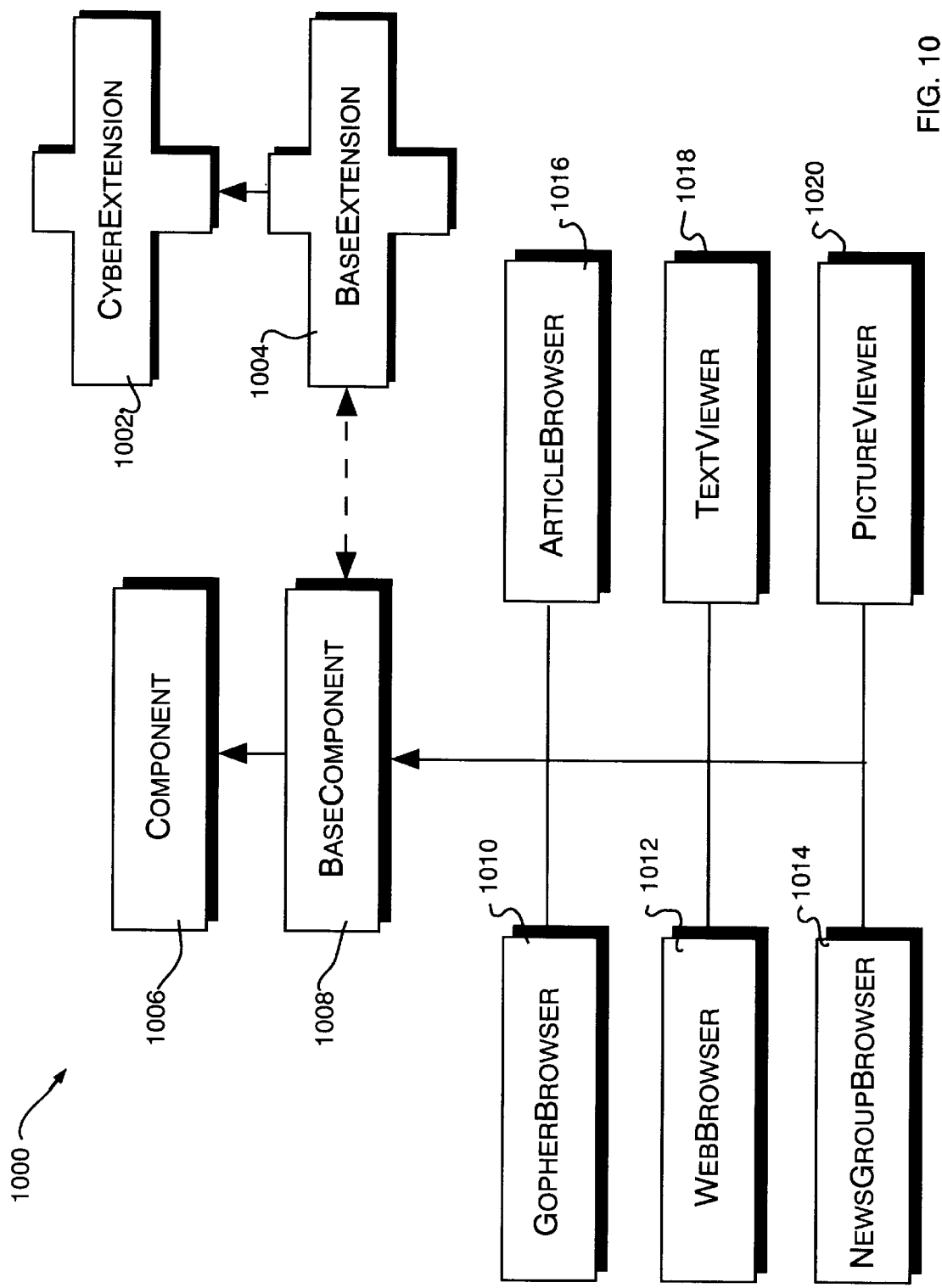
FIG. 10 is a simplified class hierarchy diagram illustrating a base class CyberExtension, and its associated subclasses.

FIG. 10 is a simplified class hierarchy diagram 1000 of the base class CyberExtension 1002 which represents additional behaviors provided to components of the underlying software component architecture. For example, CyberExtension objects add functionality to, and extend the APIs of, existing components so that they may communicate with the network components, such as the encapsulated entity objects. As a result, the CyberExtension base class 1002 operates in connection with a Component base class 1006 through their respective subclasses BaseExtension 1004 and BaseComponent 1008.

CyberExtension objects are used by components that display the contents of CyberItem objects; this includes browser-like components, such as a Gopher browser or Web browser, along with viewer-like components, such as JPEG, MPEG or text viewers. The CyberExtension objects also keep track of the CyberItem objects which these components are responsible for displaying. The class GopherBrowser 1010 may be used to construct a Gopher-like network browsing component and the class WebBrowser 1012 may be used to construct a Web-like network browsing component.

As noted, it may be desirable to associate information securely with the encapsulated network entity in a persistent or temporal fashion. Such information may comprise a user's password, a network address or anything that may be considered sensitive if easily discovered by another party. In accordance with the present invention, a technique is provided for creating an autonomous network entity that stores sensitive information in a cryptographically secure manner. The autonomous entity preferably comprises a data structure that encapsulates cryptographically-transformed information along with the inputs of a key used to reverse the transformation. Cryptographic storage of the sensitive information and its reversable key within the encapsulated entity makes the entity autonomous and capable of transfer among computer platforms and their processes without compromising the security of the information.

Figure 11:
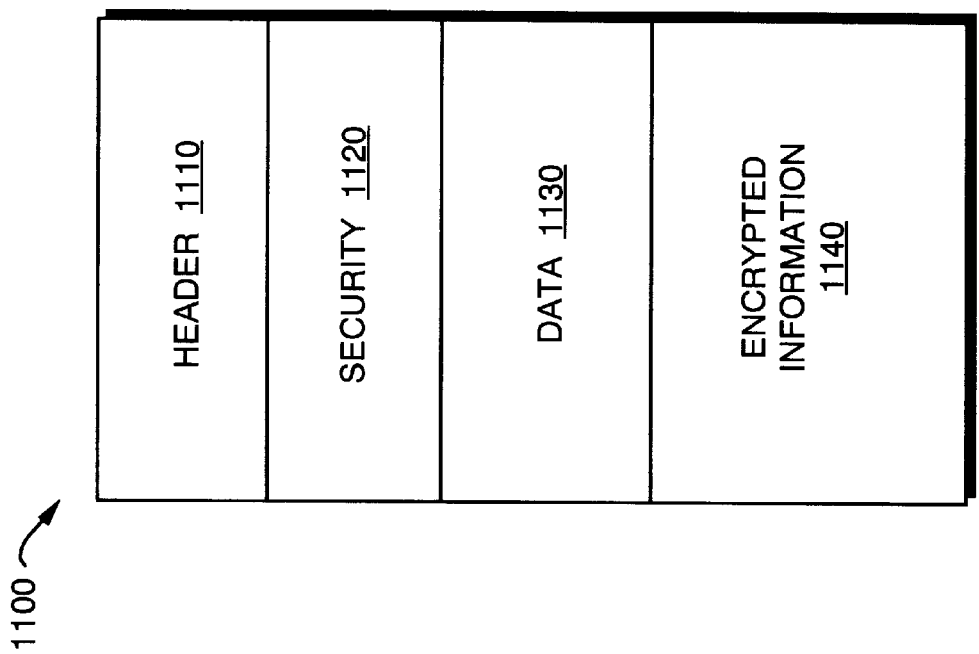
FIG. 11 is a schematic diagram of a secure autonomous network entity in accordance with the invention.

In general, the technique comprises a multi-stage key calculation process that generates the key for each instantiation of the network entity. The multi-stage calculation process, in turn, preferably comprises a random number generation stage followed by a crytographically-secure message digest stage for both encrypting the sensitive information and thereafter decrypting the encrypted information. The key produced from the message digest stage is used initially to encrypt the sensitive information prior to associating it with the network entity in a manner suitable to the computing environment. For example, the encrypted information may be encapsulated within the entity. FIG. 11 is a schematic diagram of the secure autonomous network entity 1100 in accordance with the invention.

As can be seen, the secure entity comprises a plurality of fields, including a 32-bit header field 1110 for storing a version string of the entity and an arbitrary-length data field 1130 for storing non-encrypted data, such as a URL pointer to a network resource. A 32-bit security field 1120 is also provided for storing a security "cookie", while an arbitrary-length encrypted information field 1140 contains the sensitive information destined for encryption, such as a password. In the illustrative embodiment, the security cookie is a random number R1 generated by a conventional random number generator; as described below, R1 is used as a seed to generate a new random number R2 during the random number generation stage of the key generation process.

Figure 12:
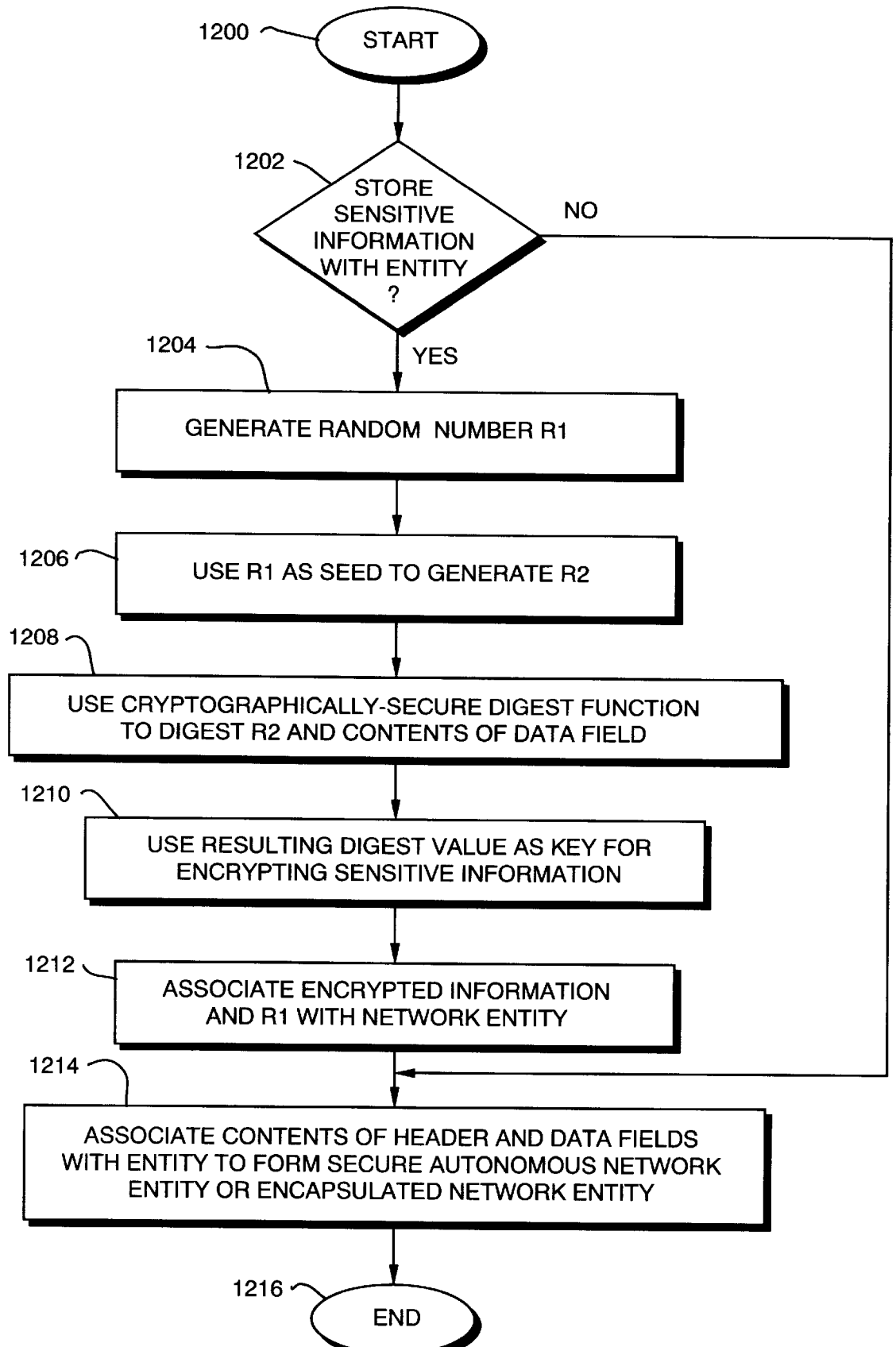
FIG. 12 is an illustrative flowchart of the sequence of steps involved in the multi-stage key generation process when creating the secure autonomous network entity.

FIG. 12 is an illustrative flowchart of the sequence of steps involved in the multi-stage key generation process used to create the secure autonomous network entity. The sequence starts at Step 1200 and proceeds to Step 1202 where it is determined whether sensitive information need be stored with the entity. If not, the contents of the header field 1110 are associated with the contents of the data field 1130 to form an encapsulated network entity in Step 1214.

However, if there is sensitive information associated with the network entity (Step 1202), a random number R1 is generated in Step 1204. Any suitable conventional random number generator may be used to generate R1; for example, random data such as a user's key strokes and their timings may be employed, as well as numerous calls to a random number generation function or hardware noise generator. The specific type of generator is optional to allow for variations that would make this particular mechanism less deterministic.

In Step 1206, R1 is used as a seed to generate a new random number R2. Again, the type of conventional random number generator used here is unspecified to provide a less-deterministic mechanism; however, it should be noted that the same random number generator mechanism used to generate R2 during the encryption stage of the process must be used when generating R2 for the decryption stage (see FIG. 13).

In Step 1208 a cryptographically-secure message digest function is used to digest R2 together with any non-sensitive, unencrypted data (e.g., URL) associated with the data field 1130 of network entity 1100. Here, the point at which R2 is digested with the unencrypted data is unspecified and is likely to be determined at run-time, perhaps based on a hint from R2 itself. An example of a conventional message digest function is the cryptographically-secure MD5 algorithm.

The resulting digest value is the key used to encrypt the sensitive information in Step 1210. Preferably, the key is a secret key used with a conventional secret key algorithm, such as DES or (RSA) RC2, to encrypt the information. The encrypted information and R1 are then associated with the encapsulated network entity in Step 1212 by, e.g., storing them in their appropriate fields of the network entity 1100. The contents of these fields are then associated with the header and data fields to create the secure autonomous network entity in Step 1214 and the sequence then ends in Step 1216.

Figure 13:
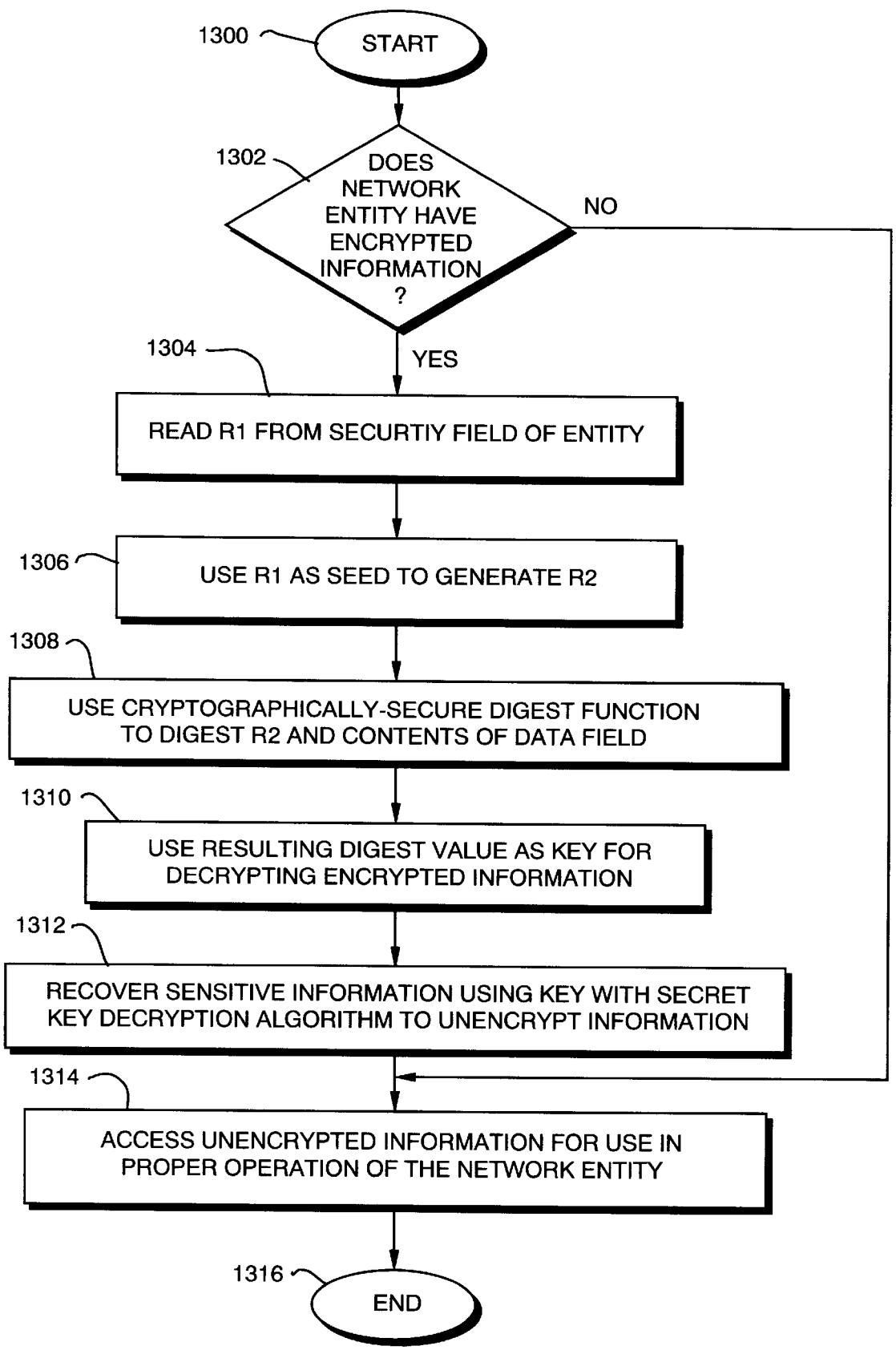
FIG. 13 is an illustrative flowchart of the sequence of steps involved in the multi-stage key generation process when accessing the contents of the secure autonomous network entity.

Upon accessing the encrypted contents of the encapsulated entity, the key calculation process is repeated and the resulting key is used to decrypt the information. FIG. 13 is an illustrative flowchart of the sequence of steps involved in the multi-stage key generation process when accessing the contents of the secure autonomous network entity. The sequence starts at Step 1300 and proceeds to Step 1302 where it is determined whether the network entity contains encrypted information; this determination may be rendered based on the existence of information stored in the encrypted information field 1140. If the entity does not contain encrypted information, the contents of the unencrypted data field 1130 may be directly accessed in Step 1314 and used accordingly.

If the entity does contain encrypted information (Step 1302), the R1 contents of the security field 1120 are retrieved in Step 1304 and that random number is used as the seed for generating M in Step 1306. The cryptographically-secure message digest function used when encrypting the sensitive data is again used in Step 1308 to decrypt that information; similarly, the same point at which R2 is digested with the unencrypted data in the encryption stage is used in this decryption stage. In Step 1310, the resulting digest value is the secret key used to decrypt the encrypted information; this key is further used with the same secret key algorithm used to encrypt the information to recover the original sensitive information in Step 1312. The recovered information may be used in any manner conducive to the proper operation of the network entity (Step 1314); indeed, the manner in which the network entity uses that information is purely a local matter. The sequence then ends in Step 1316.

In summary, the inventive technique greatly enhances the ability of a user to associate sensitive information securely with the autonomous network entity in a persistent or temporal fashion. The network entity is implemented as a network component of the network-oriented component system and stored as a visual object, e.g., an icon, for display on a graphical user interface of the system. Such visual display allows a user to easily (i) manipulate the entity component to display its contents on a computer screen, (ii) duplicate the entity by dragging the icon to other components of the system, or (iii) electronically forward the entity over computer networks, all while maintaining the integrity of the secure information.

Advantageously, the inventive encapsulation technique allows a user to simply manipulate visual objects when accessing information on the network. Instead of having to type the destination address of a resource, the user can merely "drag and drop" the icon associated with entity anywhere on the graphical user interface. When the user "double clicks" on the icon, the entity opens up in a window and displays the contents of the resource at that network location. Since the address is encapsulated within the network reference entity, the user does not have to labor with typing of the cumbersome character string; in fact, a direct benefit of the present invention is that the secure information, e.g., a password, does not need to be re-typed. Moreover, by encapsulating the inputs of the secret key within the structural confines of the entity, the user may reverse the cryptographic transformation of the sensitive information at any time.

While there has been shown and described an illustrative embodiment for creating an autonomous network entity that stores sensitive information in a cryptographically secure manner, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment and networking functions designed to perform specific classes of operations. These functions are invoked as needed by the software component layer to perform the desired operations. Specifically, DLLs, which are generally well-known, may be used to interact with the component layer and window manager to provide network-specific components and functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for creating an autonomous network entity configured to securely store sensitive information provided by a user of a computer coupled to a network having at least one network resource, the method comprising the steps of:

creating an encapsulated entity component containing a reference to a location of the at least one network resource on the computer network;

cryptographically-transforming the sensitive information using a key generated in accordance with inputs used in a multi-stage key generation process; and encapsulating the cryptographically-transformed information, along with the inputs of the key within the encapsulated entity to create the autonomous network entity, wherein the key is retrievable solely by subjecting the inputs contained within the encapsulated entity to the multi-stage key generation process, thereby allowing the sensitive information to be recovered.

2. The method of claim 1 farther comprising the step of reversing the cryptographically-transformed information to recover the sensitive information using the inputs of the key encapsulated within the autonomous network entity.

3. The method of claim 2 further comprising the step of storing the autonomous network entity as a visual object on the computer.

4. The method of claim 3 further comprising the step of manipulating the visual object with a pointing device to display contents of the autonomous network entity on a screen of the computer.

5. The method of claim 4 further comprising the step of transferring the autonomous network entity among computer platforms and their processes without compromising the security of the sensitive information.

6. The method of claim 1 wherein the step of cryptographically-transforming comprises the step of generating a first random number using a random number generator.

7. The method of claim 6 wherein the step of cryptographically-transforming further comprises the step of generating a second random number using the first random number as a seed into a random number generator mechanism.

8. The method of claim 7 wherein the step of cryptographically-transforming further comprises the step of digesting the second random number using a cryptographically-secure message digest function to produce the key.

9. The method of claim 7 wherein the step of cryptographically-transforming further comprises the step of digesting the second random number in addition to other inputs using a cryptographically-secure message digest function to produce the key.

10. The method of claim 9 wherein the other inputs comprise non-encrypted information.

11. The method of claim 10 wherein the step of cryptographically-transforming further comprises the step of encrypting the sensitive information using the key in connection with a secret key algorithm.

12. The method of claim 11 wherein the inputs of the key include the first random number and wherein the step of encapsulating comprises the step of storing the encrypted information and the first random number in various fields of the network entity.

13. A computer coupled to a network, the computer comprising:

a memory for storing data and programs, including an operating system;

a processing unit responsive to the programs for controlling and coordinating the operation of the computer;

a software component layer coupled in cooperating relation with the operating system; and a data structure created by the software component layer, the data structure containing a reference to a location of a network resource on the computer network, the data structure further encapsulating cryptographically-transformed information along with inputs of a key used to reverse the transformation.

14. Apparatus for creating an autonomous network entity configured to securely store sensitive information provided by a user of a computer coupled to a network having at least one network resource, the apparatus comprising:

means for creating an encapsulated entity component containing a reference to a location of the at least one network resource on the computer network;

means for cryptographically-transforming the sensitive information using a key generated in accordance with inputs used in a multi-stage key generation process; and means for encapsulating the cryptographically-transformed information, along with the inputs of the key within the encapsulated entity to create the autonomous network entity, wherein the kev is retrievable solely by subjecting the inputs contained within the encapsulated entity to the multi-stage key generation process, thereby allowing the sensitive information to be recovered.

15. The apparatus of claim 14 further comprising means for reversing the cryptographically-transformed information to recover the sensitive information using the inputs of the key encapsulated within the autonomous network entity.

16. The apparatus of claim 15 wherein the cryptographically-transforming means comprises means for generating a first random number using a random number generator.

17. The apparatus of claim 16 wherein the cryptographically-transforming means further comprises means for generating a second random number using the first random number as a seed into a random number generator mechanism.

18. The apparatus of claim 17 wherein the cryptographically-transforming means further comprises means for digesting the second random number using a cryptographically-secure message digest function to produce the key.

19. The apparatus of claim 17 wherein the cryptographically-transforming means further comprises means for encrypting the sensitive information using the key in connection with a secret key algorithm.

20. The apparatus of claim 19 wherein the inputs of the key include the first random number and wherein the encapsulating means comprises means for storing the encrypted information and the first random number in various fields of the network entity.

* * * * *